United States Patent
Cirne (12)

(10) Patent No.: US 6,260,187 B1
(45) Date of Patent: Jul. 10, 2001

(54) SYSTEM FOR MODIFYING OBJECT ORIENTED CODE

(75) Inventor: Lewis K. Cirne, Santa Cruz, CA (US)

(73) Assignee: Wily Technology, Inc., Burlingame, CA (US)

( * ) Notice: Subject to any disclaimer, the term of this patent is extended or adjusted under 35 U.S.C. 154(b) by 0 days.

(21) Appl. No.: 09/137,666

(22) Filed: Aug. 20, 1998

(51) Int. Cl.[7] ....................................................... G06F 9/45
(52) U.S. Cl. .................................................................. 717/1
(58) Field of Search ................................. 395/701; 717/1

(56) References Cited

U.S. PATENT DOCUMENTS

| | | | |
|---|---|---|---|
| 5,193,180 | 3/1993 | Hastings ................................. | 717/10 |
| 6,021,272 | 2/2000 | Cahill et al. .............................. | 717/5 |

OTHER PUBLICATIONS

Walnum, Java by Example, 1996, QUE, pp. 173–187 and 193–196.*
Lindholm–Yellin, The Java™ Virtual Machine Specification, 09/1996, Addison–Wesley, p. 24, and p. 322.*
Korson–McGregor, Understanding Object–oriented: a Unifying Paradigm, 09/1990, Communications of the ACM.*
McComb, Understanding and Using JavaScript Statements, 12/1996, JavaWorld.*
Sun Microsystems, The Java Language Specification, Chapter 8 (Classes), 01/1996, Addison–Wesley.*
Java Q&A Experts, The applet constructor, 10/1999, JavaWorld.*
Sundsted, Localize this!, 01/1998, JavaWorld.*
Parr, Java Objects are Concious, Nov. 10, 1999, http://developer.java.sun.com.*
Binary Component Adaptation, by Keller and Holzle, University of California, Technical Report, Dec. 3, 1997.
BIT: A Tool for Instrumenting Java Bytecodes, by Lee and Zorn, USITS 97, Dec. 1997.
Automatic Program Transformation with JOIE, by Cohen, Chase, Kaminsky, USENIX Annual Technical Symposium, Jun. 1998.
EEL: Machine–Independent Executable Editing, by Larus and Schnarr, SIGPLAN Conference on Programming Language Design and Implementation, Jun. 1995.

* cited by examiner

Primary Examiner—Mark R. Powell
Assistant Examiner—Hoang-Vu Antony Nguyen-Ba
(74) Attorney, Agent, or Firm—Fliesler Dubb Meyer & Lovejoy LLP

(57) ABSTRACT

The system receives three sets of inputs: program class definitions, a set of rules, and additional class definitions to be merged with the program class definitions. There are three types of rules: the first rule is used to substitute the allocation of an object of a new class for the allocation of the object based on an original class; the second rule is used to change code that allocates an object of an original class to code that calls a static method that allocates the object of the original class; and the third rule is used to a replace a new static field for an original static field. The system separately reads each of the original class definitions into a class data structure and performs the modifications to the class data structure according to the set of rules. The resulting class data structure is written to an output stream.

65 Claims, 8 Drawing Sheets

SYSTEM FOR MODIFYING OBJECT ORIENTED CODE

BACKGROUND OF THE INVENTION

1. Field of the Invention

The present invention is directed to a system for modifying object oriented code.

2. Description of the Related Art

Java is an object oriented programming language that contains built-in support for the Internet, freeing the programmer from the burden of designing ad hoc solutions to common Internet problems. Java generates extremely small executables to facilitate faster loading over potentially slow communication lines. Additionally, Java is machine independent. That is, the same executable program should be capable of being executed on a PC, a Mac or even a UNIX machine. Because of these features, software developers worldwide are adopting Java technology at a compelling rate. For example, many web pages on the Internet include Java applets in addition to HIM instructions. Furthermore, many software systems are being written in Java in an attempt to allow the code to operate across many platforms.

While Java provides many new features useful to both programmers and users, Java also brings with it a new set of problems. One feature of Java discussed above is that it can easily be used on the Internet. Thus, rather than shrink wrap software to sell in stores, many software programs are sold on the Internet. This will allow any person anywhere in the world to download a computer program that should run on almost any platform. However, different people and different cultures may have different needs for their computer program. For example, since different languages are spoken in different parts of the world, it is desirable to have the user interface of the computer program be tailored for the local culture. Furthermore, certain people have special needs, such as color blind people may prefer gray scale user interfaces rather than color interfaces. This problem has previously been taken care of by creating different versions of a particular executable and only allowing the relevant versions to be available in stores in the local communities. With the distribution of software on the Internet, it is harder to direct the right executable to the right people. Thus, it would be useful to be able to modify software downloaded from the internet in order to add features needed by corporations, local communities and other special interests groups. Some software may need modifications (to accommodate users) that the manufacturer did not anticipate. Furthermore, rather than design and ship multiple versions of a software product it may be more cost effective to ship one version of the software and let the different user groups modify the software to meet their needs.

Because Java code can be run on different platforms and can be downloaded from web pages, computer users with access to the Internet or other networks can easily find and download new Java programs and install these programs on their computer. In a local area network (e.g. an office), it will be difficult to monitor all new programs being downloaded and installed. Many of these programs could wreak havoc on the network Managers of networks have no easy way to monitor, track profile or otherwise provide some means for understanding what users on the network are doing. A network manager would benefit from the ability to modify Java programs that are downloaded from the Internet to add functionality that profiled the downloaded code, alerted the network manager of the new program or added other security features.

Although Java is intended to be platform independent, different entities have implemented the Java Virtual Machine in different ways. Therefore, a Java applet may not necessarily run in the same manner on all virtual machines. In fact, some applets may not run at all on certain virtual machines. Debugging Java code to figure out why it works in some machines and not others can be very difficult. Furthermore, nobody may be aware that a certain applet does not work on a certain virtual machine until the user is attempting to execute the applet. Software developers and software users would benefit from a tool that could add functionality to an existing Java executable to add debugging tools to Java code or, to add functionality, features or bug fixes that are specific to a particular virtual machine.

The above discussion demonstrates a need to modify Java programs after they have been completed by the developer. Most previous attempts to modify code attempt to do so at the source code level. That is, source code is run through a compiler that can add additional instructions for profiling, debugging, etc. Since most Java code available for downloading on the web or purchasing at a store is not source code, it is not practical to modify the source code of a Java program. Most Java code downloaded or sold is object code. Object code is code that has been compiled, as distinguished from source code. Some systems can execute object code. For Java, object code is executable code. Furthermore, previous attempts to modify code have not taken into account nor taken advantage of the object oriented paradigm of Java.

System Object Model (SOM) is an object technology developed by IBM. SOM provides the ability at run time to replace the use of one class for another class, but does not make special provisions for a final class and it does not provide for the substitution of static fields. Furthermore, because SOM operates at run time, any changes made are not permanent. Thus, after execution is complete, the user is left with the original program rather than a modified version that can be shipped to other users. Furthermore, SOM does not work with Java and in order to use SOM the source code must be written to utilize the SOM API. It would be desirable to have a system that can modify an executable, with no preparation for the modification made in the source, and allow the modification to be permanent for distribution.

Thus, there is a need for a tool that can modify Java or other object oriented code to add new functionality to the existing code.

SUMMARY OF THE INVENTION

The present invention, roughly described, includes a code modifier that receives three sets of inputs: program class definitions, a set of rules, and additional class definitions to be merged with the original class definitions. There are three types of rules: the first rule is used to substitute the allocation of an object of a new class for the allocation of the object based on an original class; the second rule is used to change code that allocates an object of an original class to code that calls a static method in another class that allocates the object of the original class; and the third rule is used to a replace a new static field for an original static field. The system reads the program class definitions into a class data structure and performs the modifications to the class data structure according to the set of rules. In one embodiment the system for modifying object oriented code performs the steps of reading a rule defining a change to object code defining an object oriented class, modifying the object code based on the rule, and writing the modified object code to a stream.

The system of the present invention can be implemented using software that is stored on a processor readable storage medium and executed using a processor. For example, the code modifier described below can be implemented in software and run on a general purpose computer. Alternatively, the invention can be implemented in specific hardware, or a combination of specific hardware and software, designed to carry out the methods described herein.

The code modifier of the present invention may be used change a user interface or add features specific to a particular virtual machine. The code modifier may also be used to modify existing applets used on a network to generate diagnostic or security information about the applets and send that diagnostic information to a server for presentation to a network administrator. Additionally, the code modifier can also be used to enable applets to communicate with a server on the Internet from behind a firewall by adding functionality to the applet that lets the applet redirect its communication to its original host through a proxy server on the firewall. Obviously, there are many other uses of the code modifier of the present invention. The intended use of the code modifier does not effect the design. Rather, the code modifier is designed as a generic tool that can be customized by use of the rules and the additional classes which serve as inputs.

These and other objects and advantages of the invention will appear more clearly from the following detailed description in which the preferred embodiment of the invention has been set forth in conjunction with the drawings.

DETAILED DESCRIPTION

Figure 1:
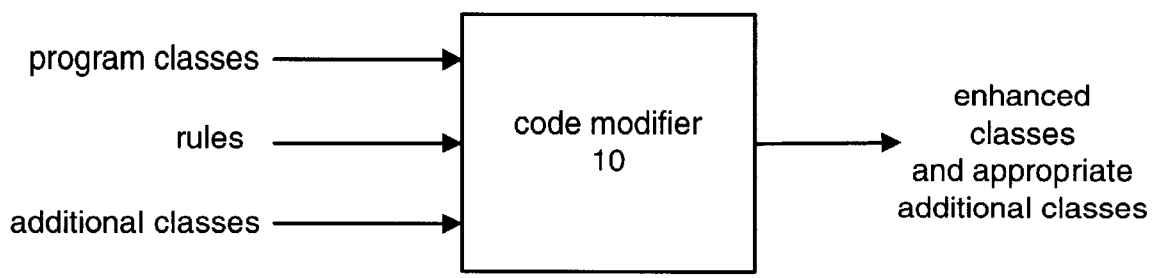
FIG. 1 is a block diagram of the code modifier of the present invention.

FIG. 1 shows a block diagram of the code modifier 10 of the present invention. Code modifier 10 includes three inputs. The first input includes the program classes, which are the classes to be changed. These classes could be an applet downloaded from the Internet, a Java application, or any program that conforms to the Java binary specification. The second input to code modifier 10 are the rules. There are three types of rules. The first type of rule is a substitute class rule which has the format:

Substitute Class: <original class> <new class>.

The substitute class rule instructs code modifier 10 to change the code that allocates an object of the <original class> to code that allocates the object to be of the <new class>, where the <new class> extends (or is a subclass of) the <original class>. A subclass is a first class that inherits the methods and fields of a second class, and is capable of extending or modifying the functionality of the second class. That class whose fields and methods are being inherited is called a superclass. Because a subclass inherits from the superclass and can extend the functionality of the superclass, a subclass is said to extend a superclass.

For Java code, the allocation of an object includes two steps: (1) creating the object and (2) invoking the object's constructor. An object's constructor is a method that is invoked once to make the object useable. For Java code, the constructor is the method <init>. When the present invention is used with object oriented languages other than Java, the allocation of an object may be different from what is described above.

The second type of rule is the proxy class rule which has the format:

Proxy Class: <original class> <proxy Allocator Class>.

The Proxy class rule instructs code modifier 10 to change the code that allocates an object of <original class> to code that calls a static method in <proxy Allocator Class>. The static method will allocate the object of <original class> and must accept the same arguments as the constructor. In one embodiment the <original class> in the proxy class rule is a final class. A final class is a class that cannot be extended. That is, it can have no subclasses. Thus, while a final class can have a superclass, a final class cannot be a superclass. A static method is defined as method that is shared among all objects. That is, a static method is one that does not operate on a single object (there is no this object). Thus, even a subroutine call can be thought of as a static method.

The third rule is a substitute static field rule which has the following format:

Substitute Static Field: <original static field> <new static field>.

The substitute static field rule directs code modifier 10 to substitute the <new static field> for the <original static field>. The new static field should be defined in the same class as the original static field or a subclass of the class defining the original static field. These three rules allow a user of code modifier 10 to change the functionality of an object oriented program.

The third input to code modifier 10 are additional classes. The set of additional classes includes some or all of the new classes and Proxy Allocator classes referenced by the rules. The inputs to code modifier 10 are one or more files. Alternatively, the inputs can be entered using a user interface or some other input/output mechanism (e.g. a network connection). The output of code modifier 10 includes the enhanced classes (e.g. the original classes after modifications) and the appropriate additional classes used according to the rules, all merged together in one or more output streams (files, network, etc.). By merged together, it is meant that they are written to the same file (e.g. zip or jar), to the same directory, or to the same storage element.

Figure 2:
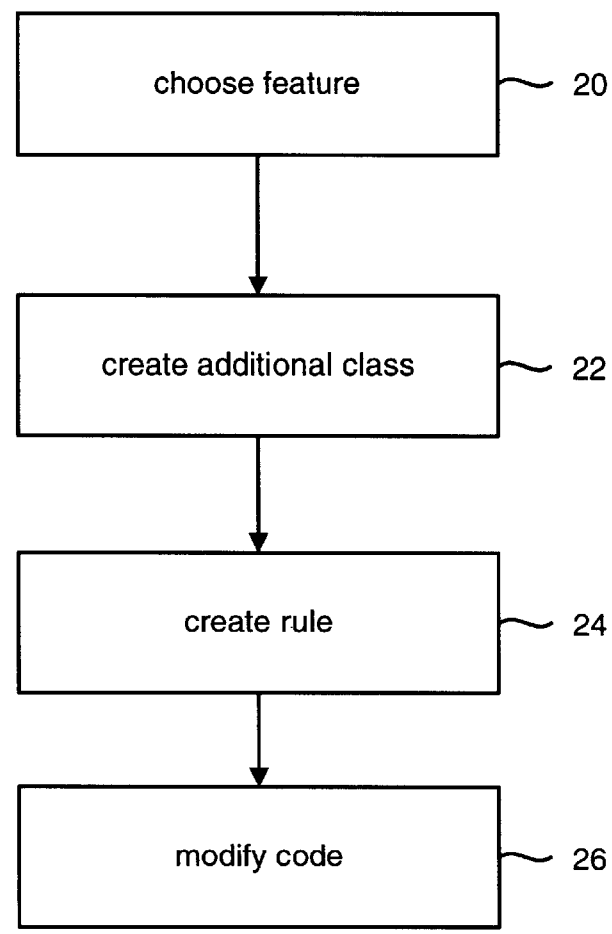
FIG. 2 is a flow chart explaining the steps of using the code modifier.

FIG. 2 is a flow chart which explains how code modifier 10 is used. In step 20, a user of code modifier 10 will identify a feature in the program for which the user desires to change. The user can also desire to add a new feature to the program. For example, a user may wish to change a user interface from English to French, or change the color of the interface, or add new buttons. In step 22, the user creates the set of additional classes that implement these changes. That is, the user writes Java software (or C++ or other object oriented code) that includes code for implementing the features the user wishes to change or add. In step 24, the user creates a rule or set of rules to implement the change. In step 26, code modifier 10 operates on the program classes using the rules and the set of additional classes. For example, if the color of a button is set by a static field and the user wants to change that static field, the user may create a change static field rule in step 24 and input that rule to code modifier 10 in step 26. Alternatively, the user may wish to add a new button to a dialog box. Thus, in step 24, the user would create a substitute class rule to substitute a new class for an original class.

Figure 3:
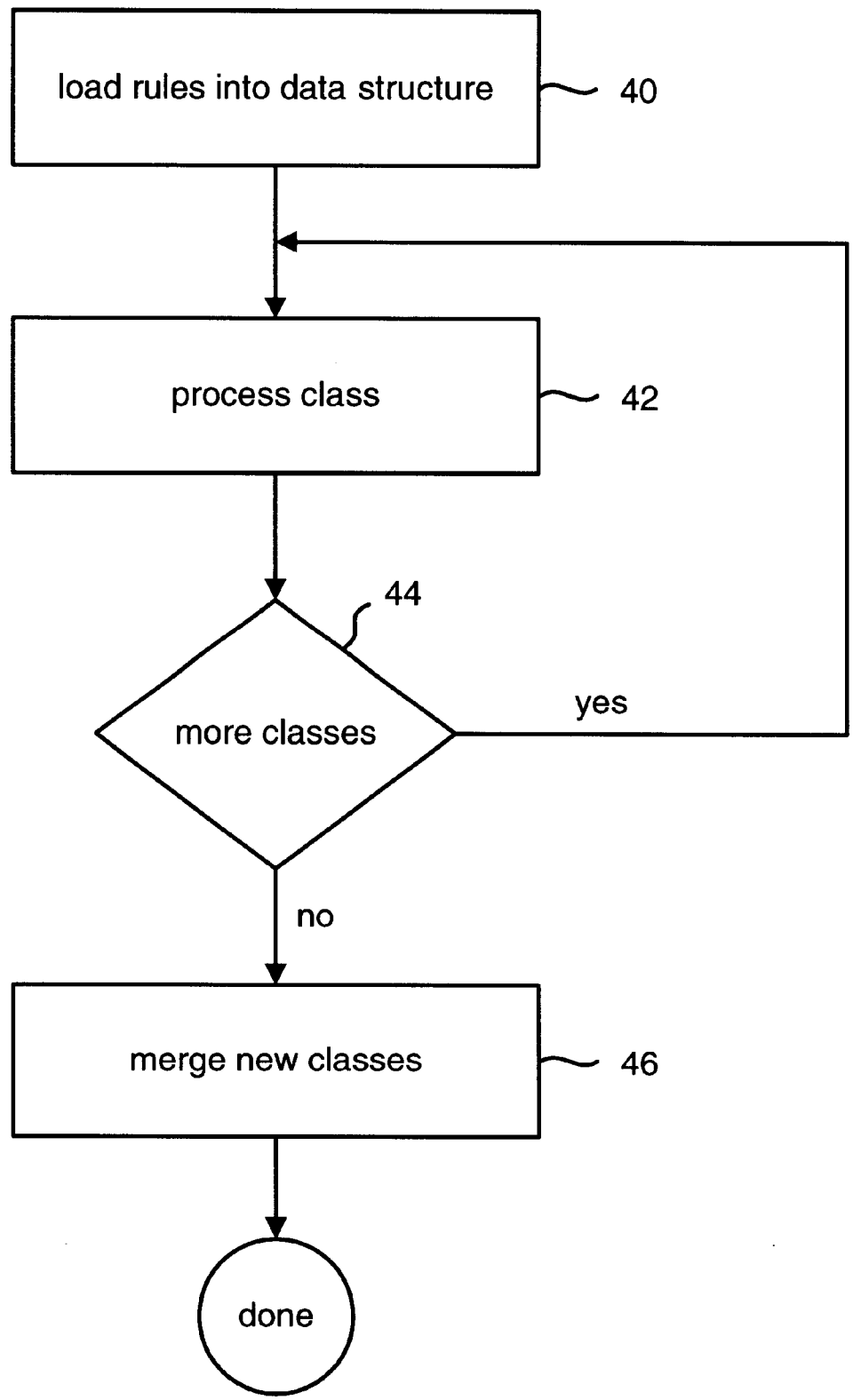
FIG. 3 is a flow chart explaining the operation of the code modifier.

FIG. 3 is a flow chart explaining the operation of code modifier 10. In step 40, code modifier 10 loads the rules into a data structure. The exact form of the data structure is not important. In step 42, code modifier 10 processes a class from the set of program classes using the rules and set of additional classes. In step 44, code modifier 10 determines whether there are any more classes to process. If there are more classes, then the system loops back to step 42 and processes the next original class. If there are no more classes to process (step 44), then the system merges the relevant additional classes with the modified program classes into a file or set of files. While it is anticipated that the <original class> referenced in the rules is from the set of program classes and the <new class> is from the set of additional classes, such an arrangement is not required. For example, both the <new class> and the <original class> can be from the set of program classes. Other variations can also exist.

Figure 4:
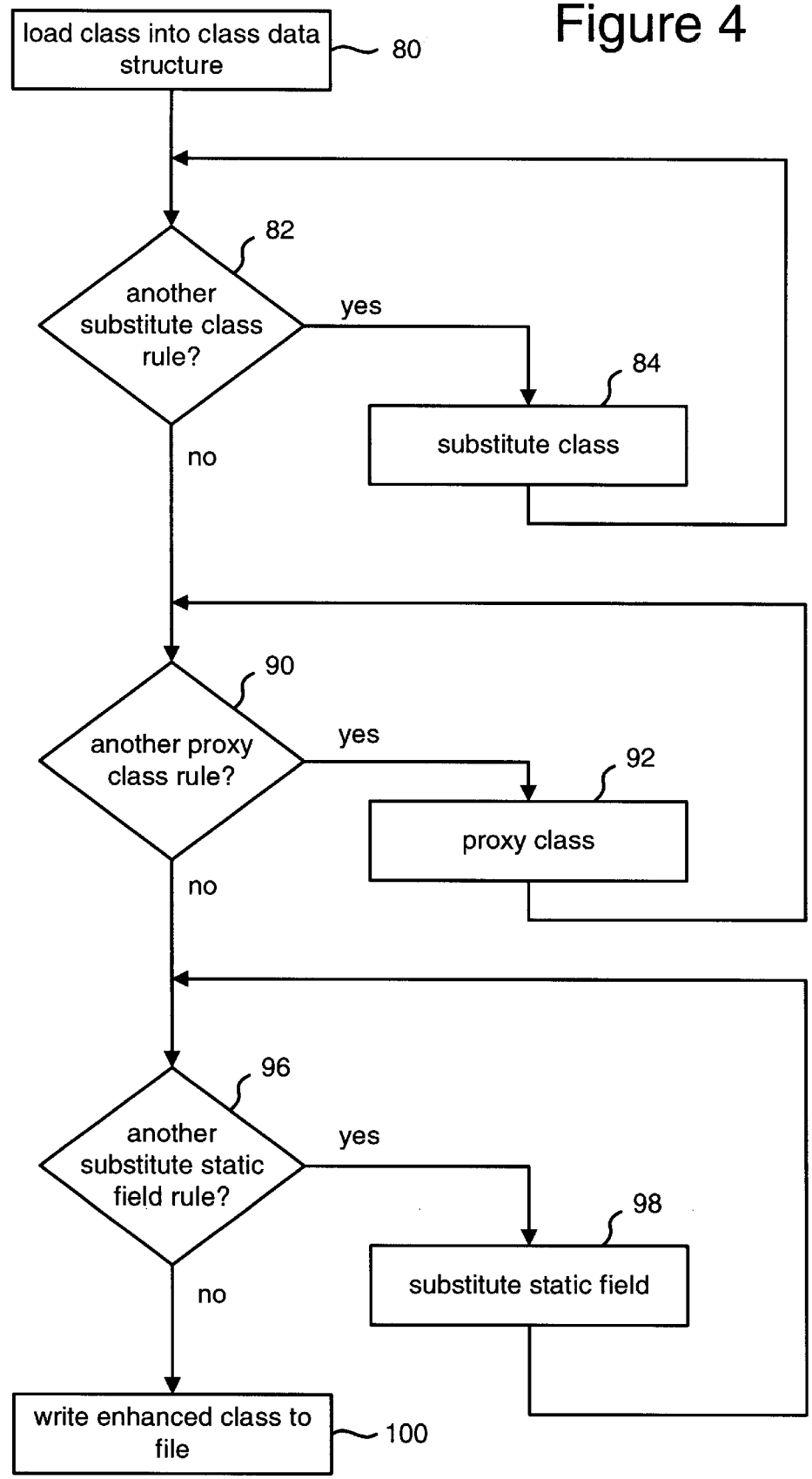
FIG. 4 is a flow chart explaining the process class step 42 of FIG. 3.

FIG. 4 is a flow chart explaining the details of step 42 of FIG. 3. In step 80, code modifier 10 loads a class into a class data structure. In step 82, code modifier 10 determines whether there is another substitute class rule in the rule data structure which has not been implemented on the current class loaded into the class data structure. If there is another substitute class rule, then code modifier 10 performs the substitute class method 84 and then loops back to step 82. If there are no more substitute class rules to implement for the current class, then code modifier 10 determines whether there is another proxy class rule in the rule data structure which has not been implemented on the current class (step 90). If so, the system performs proxy class method 92 and loops back to step 90. When there are no more proxy class rules to consider, the system determines whether there are any more substitute static field rules (step 96). If there is another substitute field rule in the rules data structure which has not been implemented on the current class (step 96), then code modifier 10 performs the substitute static field method 98 for that substitute static field rule and loops back to step 96. When there are no more substitute static field rules to consider, the system writes the enhanced (or possibly unmodified) class to an output stream in step 100. The output stream can be sent to a file, a network connection, a memory buffer, a monitor or any other output mechanism. The enhanced class can be written to a new file or written over the old file. In one embodiment, code modifier 10 can partially write over the old file by leaving the instructions that have not changed and writing over the instructions that have been modified.

Figure 5:
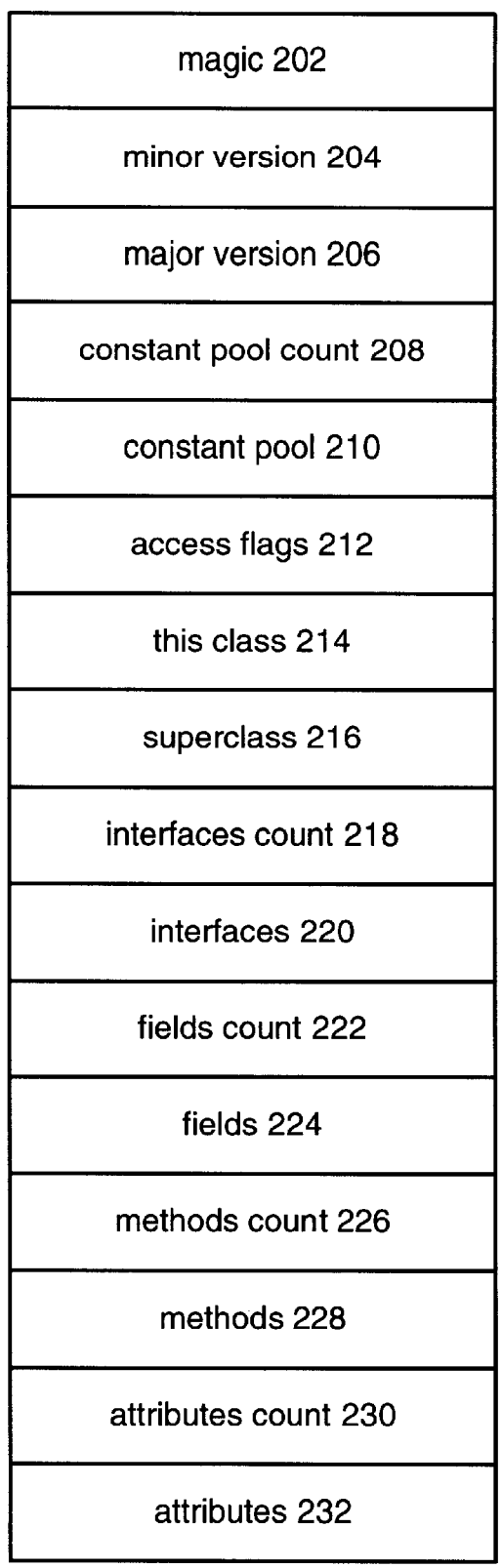
FIG. 5 depicts a symbolic representation of the class data structure.

FIG. 5 is a symbolic representation of the class data structure which holds the code for a class. The term code is used to refer to all of the instructions, variables, definitions, pointers, addresses etc, that are stored in a class file and/or a class data structure. Magic item 202 supplies the magic number identifying the class file. The values of the minor version 204 and major version 206 items are the minor and major version numbers of the compiler that produced the class file. Constant pool count item 208, which must be greater than zero, provides the number of entries in the constant pool. The constant pool entry at index zero is included in the count but is not present in the constant pool. A constant pool index is considered valid if it is greater than zero and less than constant pool count 208. The constant pool is a table of variable length structures representing various string constants, class names, field names, integers, floating point numbers and other constants that are referred to within the class file structure and its substructures. Each of the constant pool entries at indices 1 through constant pool count-1 is a variable-length structure whose format is indicated by its first "tag" byte.

The value of access flags item 214 is a mask of modifiers used with class and interface declarations. The access flags modifiers are public, final, super, interface and abstract. The value of this class item 214 must be a valid index into the constant pool table. The constant pool entry at that index must be a CONSTANT_Class_info structure representing the class or interface defined by this class file. For a class, the value of superclass item 216 either must be zero or must be a valid index into the constant pool. If the value of the superclass item is nonzero, the constant pool entry at that index must be a CONSTANT_Class_info structure representing the superclass of the class defined by this class file. Neither the superclass nor any of its superclasses may be a final class. If the value of a superclass item is zero, then this class file must represent the class java.lang.Object, the only class or interface without a superclass.

The value of interfaces count item 218 provides the number of direct superinterfaces of this class or interface type. Each value in the interfaces array 220 must be a valid index into the constant pool. The constant pool entry at each value of interfaces[i], where $0 \leq i <$ interfaces count, must be a CONSTANT_Class_info structure representing an interface which is a direct superinterface of this class or interface type. The value of the fields count item 222 provides the number of field_info structures in the fields table 224. The field_info structures represent all fields, both class variables and instance variables, declared by this class or interface type. Each value in the fields must be a variable-length field_info structure giving a complete description of a field in the class or interface type. The fields table includes only those fields that are declared by this class or interface. It does not include item fields that are inherited from superclasses or superinterfaces.

The value of methods count item 226 provides the number of method_info structures in methods table 228. Each value in methods table 228 must be a variable-length method_info structure providing a complete description of the Java Virtual Machine code for a method in the class or interface. The method_info structures represent all methods, both instance methods and, for classes, class (static) methods, declared by this class or interface type. Methods table 228 only includes those methods that are explicitly declared by this class. Interfaces have only the single method, the interface initialization method. The methods table does not include items representing methods that are inherited from superclasses or superinterfaces.

The value of the attributes count item 230 provides the number of attributes in attributes table 232. Each value of attributes table 232 must be a variable-length attribute structure. A class data structure can have any number of attributes associated with it. More information about ClassFile formats and the Java Virtual Machine can be found in The Java Virtual Machine Specification, Tim Lindholm and Frank Yellin, Addison-Wesley, 1997, incorporated herein by reference.

All constant pool entries have the following general format:

```
cp_info {
    tag;
    info[ ];
}
```

Each item in the constant pool must begin with a 1-byte tag indicating the type of cp_info entry. The contents of the info array varies with the value of the tag. The valid tags and their values are CONSTANT_Class, CONSTANT_Fieldref, CONSTANT_Methodref CONSTANT_InterfaceMethodref, CONSTANT_String, CONSTANT_Integer, CONSTANT_Float, CONSTANT_Long, CONSTANT_Double, CONSTANT_NameAndType, CONSTANT_Utf8. The following discussion explains the different types of constant pool entries.

The CONSTANT_Class_info structure is used to represent a class or an interface:

```
CONSTANT_Class_info {
    u1 tag;
    u2 name_index;
```

The tag item has the value CONSTANT_Class. The value of the name_index item must be a valid index into the constant pool. The constant pool entry at that index must be a CONSTANT_Utf8_info structure representing a valid fully qualified Java class name that has been converted to the class file's internal form. The values u1, u2 and u4 represent an unsigned one, two or four byte quantities, respectively.

Fields, methods, and interface methods are represented by similar structures:

```
CONSTANT_Fieldref_info {
    u1 tag;
    u2 class index;
    u2 name_and_type_index;
}
CONSTANT_Methodref info {
    u1 tag;
    u2 class_index;
    u2 name_and_type_index;
}
CONSTANT_InterfaceMethodref info {
    u1 tag;
    u2 class_index;
    u2 name_and_type_index;
}
```

The tag item of a CONSTANT_Fieldref_info structure has the value CONSTANT_Fieldref The tag item of a CONSTANT_Methodref_info structure has the value CONSTANT_Methodref The tag item of a CONSTANT_InterfaceMethodref_info structure has the value CONSTANT_InterfaceMethodref.

The value of the class_index item must be a valid index into the constant pool. The constant pool entry at that index must be a CONSTANT_Class_info structure representing the class or interface type that contains the declaration of the field or method.

The value of the name_and_type_index item must be a valid index into the constant pool. The constant pool entry at that index must be a CONSTANT_NameAndType_info structure. This constant pool entry indicates the name and descriptor of the field or method.

The CONSTANT_String_info structure is used to represent constant objects of the type java.lang.String:

```
CONSTANT_String_info {
    u1 tag;
    u2 string_index;
}
```

The tag item of the CONSTANT_String_info structure has the value CONSTANT_Sting. The value of the string_index item must be a valid index into the constant pool. The constant pool entry at that index must be a CONSTANT_Utf8_info structure representing the sequence of characters to which the java.lang.String object is to be initialized.

The CONSTANT_Integer_info and CONSTANT_Float_info structures represent four-byte numeric (int and float) constants:

```
CONSTANT_Integer_info {
    u1 tag;
    u4 bytes;
}
CONSTANT_Float_info {
    u1 tag;
    u4 bytes;
}
```

The tag item of the CONSTANT_Integer_info structure has the value CONSTANT_Integer. The tag item of the CONSTANT_Float_info structure has the value CONSTANT_Float The bytes item of the CONSTANT_Integer_info structure contains the value of the int constant. The bytes of the value are stored in big-endian (high byte first) order. The bytes item of the CONSTANT_Float_info structure contains the value of the float constant in IEEE 754 floating-point "single format" bit layout. The bytes of the value are stored in big-endian (high byte first) order, and are first converted into an int argument.

The CONSTANT_Long_info and CONSTANT_Double_info represent eight-byte numeric (long and double) constants:

```
CONSTANT_Long_info {
    u1 tag;
    u4 high_bytes;
    u4 low_bytes;
}
CONSTANT_Double_info {
    u1 tag;
    u4 high_bytes;
    u4 low_bytes;
}
```

All eight-byte constants take up two entries in the constant pool. If a CONSTANT_Long_info or CONSTANT_Double_info structure is the item in the constant pool at index n, then the next valid item in the pool is located at index n+2. The constant pool index n+1 must be considered invalid and must not be used.

The tag item of the CONSTANT_Long_info structure has the value CONSTANT_Long. The tag item of the CONSTANT_Double_info structure has the value CONSTANT_Double. The unsigned high_bytes and low_bytes items of the CONSTANT_Long structure together contain the value of the long constant ((long)high_bytes<<32)+low_bytes, where the bytes of each of high_bytes and low_bytes are stored in big-endian (high byte first) order. The high_bytes and low_bytes items of the CONSTANT_Double_info structure contain the double value in IEEE 754 floating point "double format" bit layout. The bytes of each item are stored in big-endian (high byte first) order.

The CONSTANT_NameAndType_info structure is used to represent a field or method, without indicating which class or interface type it belongs to:

```
CONSTANT_NameAndType_info {
```

```
u1 tag;
u2 name_index;
u2 descriptor_index;
}
```

The tag item of the CONSTANT_NameAndType_info structure has the value CONSTANT_NameAndType. The value of the name_index item must be a valid index into the constant pool. The constant pool entry at that index must be a CONSTANT_Utf8_info structure representing a valid Java field name or method name. The value of the descriptor_index item must be a valid index into the constant pool. The constant_pool entry at that index must be a CONSTANT_Utf8_info structure representing a valid Java field descriptor or method descriptor.

The CONSTANT_Utf8_info structure is used to represent constant string values:

```
CONSTANT_Utf8_info {
   u1 tag;
   u2 length;
   bytes [length];
}
```

The tag item of the CONSTANT_Utf8_info structure has the value CONSTANT_Utf8. The value of the length item gives the number of bytes in the bytes array (not the length of the resulting sring). The strings in the CONSTANT_Utf8_info structure are not null-terminated. The bytes array contains the bytes of the string. No byte may have the value (byte)0 or (byte)1×f0–(byte)0×ff.

Each field (see FIG. 5—fields 224) is described by a variable-length field_info structure. The format of this structure is

```
field_info {
   u2 access_flags;
   u2 name_index;
   u2 descriptor_index;
   u2 attributes_count;
   attribute_info attributes [attributes_count];
}
```

The value of the access_flags item is a mask of modifiers used to describe access permission to and properties of a field. The access_flags modifiers are public, private, protected, static, final, volatile and transient.

The value of the name_index item must be a valid index into the constant pool. The constant pool entry at that index must be a CONSTANT_Utf8_info structure which must represent a valid Java field name. The value of the descriptor index item must be a valid index into the constant pool. The constant pool entry at that index must be a CONSTANT_Utf8 structure which must represent a valid Java field descriptor. The value of the attributes_count item indicates the number of additional attributes of this field. Each value of the attributes table must be a variable-length attribute structure. A field can have any number of attributes associated with it.

Each method (see FIG. 5—methods 228), is described by a variable-length method info structure. The structure has the following format:

```
method_info {
   u2 access_flags;
   u2 name_index;
   u2 descriptor_index;
   u2 attributes_count;
   attribute_info attributes [attributes_count];
}
```

The value of the access_flags item is a mask of modifiers used to describe access permission to and properties of a method. The access_flags modifiers are public, private, protected, static, final, synchronized, native and abstract. The value of the name_index item must be a valid index into the constant pool. The constant pool entry at that index must be a CONSTANT_Utf8_info structure representing either one of the special internal method names, either <init> or <clinit>, or a valid Java method name. The value of the descriptor_index item must be a valid index into the constant pool. The constant pool entry at that index must be a CONSTANT_Utf8_info structure representing a valid Java method descriptor. The value of the attributes_count item indicates the number of additional attributes of this method. Each value of the attributes table must be a variable-length attribute structure. A method can have a number of optional attributes associated with it.

Attributes have the following general format:

```
attribute_info {
   u2 attribute_name_index;
   u4 attribute_length;
   u1 info [attribute_length];
}
```

The attribute_name_index must be a valid unsigned 16 bit index into the constant pool of the class. The constant pool entry at the attribute_name_index must be a CONSTANT_Utf8_info structure representing the name of the attribute. The value of the attribute_length item indicates the length of the subsequent information in bytes. The length does not include the initial 6 bytes that contain the attribute_name_index and attribute_length items. More information about the attributes can be found in the Java V Machine Specification, referenced above. Note that FIG. 5 shows all the data in one giant contiguous data structure. In reality, the data structure of FIG. 5 can be made up of many separate substructures. That is, many separate data structures can be used to store the components of data shown in FIG. 4. Each of these separate data structures are said to be one sub-component of the class data structure. In other words, the class data structure can be a combination of subcomponents or data structures.

Figure 6:
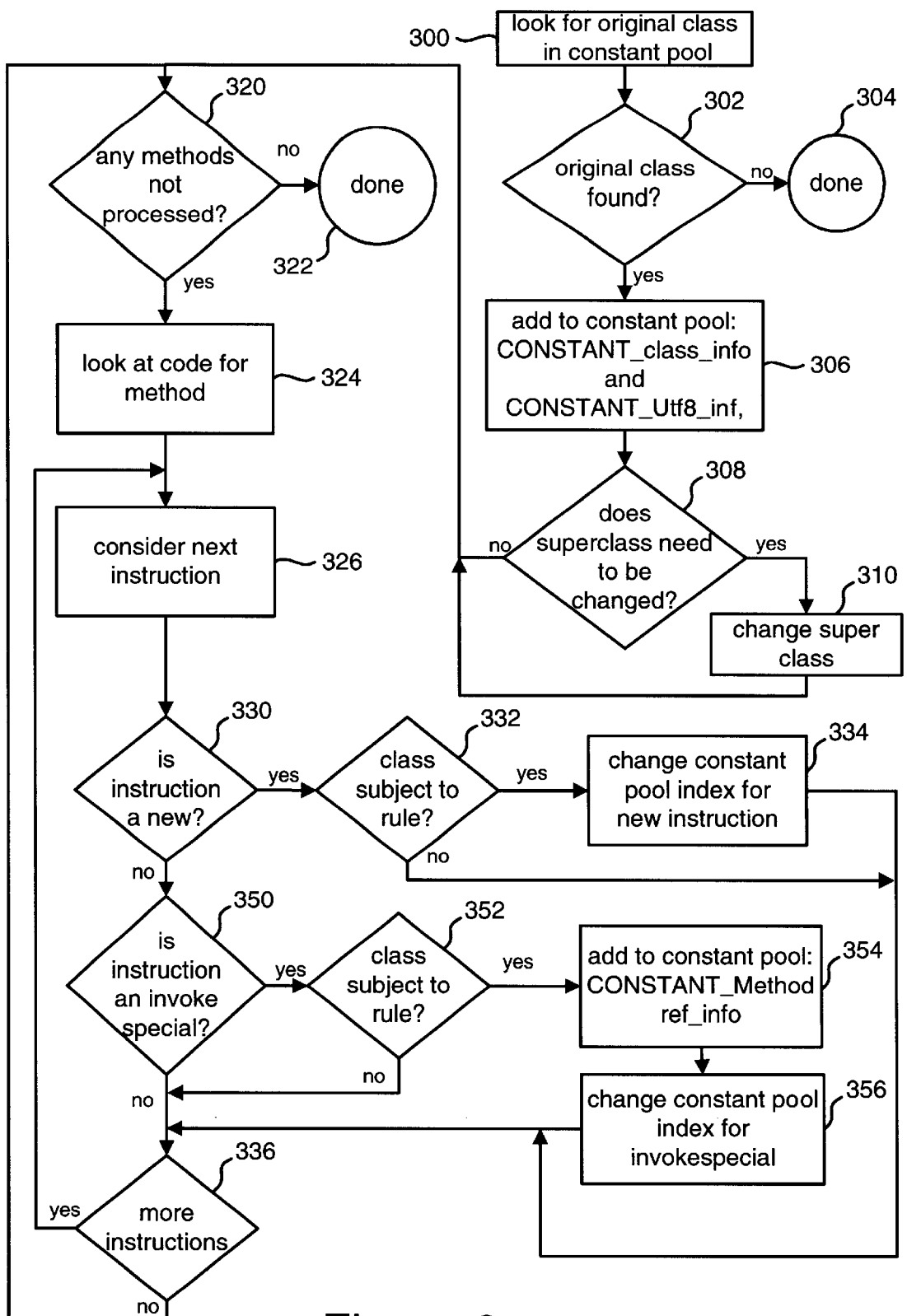
FIG. 6 is a flow chart explaining the substitute class step 84 of FIG. 4.

FIG. 6 is a flow chart which explains the method of the substitute class step 84 of FIG. 4. In step 300 of FIG. 6, code modifier 10 looks through the constant pool for an entry referencing the <original class> to be substituted for. For purposes of this patent, the term "reference" or "point to" means a direct reference or an indirect reference. An indirect reference is a reference to one or more other levels of references that eventually point to the desired destination or item. In practice, in step 300 code modifier 10 looks through the constant pool at the CONSTANT_Class_info structures. Each structure will have a name index pointing to a CONSTANT_Utf8_info structure. Code modifier 10 looks for the CONSTANT_Utf8_info structure that stores the string that matches the name of original class specified in the rule. If there is no reference in the constant pool to the original class (step 302), then the method of FIG. 6 is finished (step 304). If the original class is found in the constant pool, then, in step 306, code modifier 10 adds to the constant pool a new CONSTANT_Class_info structure and a new CONSTANT_Utf8_info structure. The CONSTANT_Utf8_info structure would include the name of the new class and the CONSTANT_Class_info structure would include a reference to the newly added CONSTANT_Utf8_info structure.

After making the additions to the constant pool, the system will test whether the superclass needs to be changed (step 308). That is, if the string eventually referred to by the index stored at superclass 216 is the original class in the substitute class rule, the superclass needs to be changed. If the superclass needs to be changed, the data in superclass 216 is changed to reflect the new class from the substitute field rule (step 310). After performing step 310, or if the superclass does not need to be changed, code modifier 10 determines whether any method in the current class under consideration need to be processed (step 320). Assuming that the current class has a method, the first time step 320 is performed no methods have been processed, thus, the answer to the test of step 320 is yes and code modifier 10 performs step 324 which involves looking at the code for the next method to be processed. If all the methods have already been processed, then the test of step 320 would fail and the method of FIG. 6 would be completed (step 322). When looking at the code for the method under consideration, the system will consider the next instruction in sequence (step 326). The system tests whether the next instruction is a "new" instruction in step 330. A "new" instruction is used to create a new object, which is the first step in allocating an object. Since the "new" instruction is used to create a new object it is called a creation instruction. The "new" instruction has the following form: new indexbyte1 indexbyte2. The unsigned indexbyte1 and indexbyte2 are used to construct an index into the constant pool, where the value of the index is (indexbyte1<<8)|indexbyte2. The item at the index in the constant pool must be a CONSTANT_Class_info structure.

If the next instruction is a "new" (step 330), then code modifier 10 determines whether the class pointed to by the index in the "new" instruction is subject to the rule under consideration (step 332). That is, is the class eventually pointed to by the index the original class defined in the rule. If not, code modifier 10 proceeds to step 350. If the class pointed to by the index is the original class defined in the rule (step 332), then, in step 334, code modifier 10 will change the index for the new instruction to point to the CONSTANT_Class_info structure added to the constant pool in step 306. After changing the constant pool index in step 334, code modifier 10 will test whether there any more instructions in the current method that need to be considered (step 336). If there are more instructions to consider, code modifier 10 loops back to step 326 and considers the next instruction. If there are no more instructions to consider, code modifier 10 will loop back to step 320 to determine whether any more methods for the current class need to be processed. If in step 332 code modifier 10 determines that the class pointed to by the "new" instruction is not subject to the rule (e.g. not the original class), then code modifier 10 loops to step 336.

If (in step 330) code modifier 10 determines that the next instruction is not a "new," then code modifier 10 loops to step 350 and determines whether the instruction is an "invokespecial." If the instruction is not an "invokespecial," then code modifier 10 aligns the program counter for all other types of instructions and tests to see whether there are any more instructions for the current method in step 336. The "invokespecial" instruction invokes an instance method. The format of an "invokespecial" instruction is: invokespecial indexbyte1 indexbyte2. The unsigned indexbyte1 and indexbyte2 are used to construct an index into the constant pool of the current class, where the index is (indexbyte1<<8) |indexbyte2. The item at that index in the constant pool must be a CONSTANT_Methodref_info structure, which itself points to a CONSTANT_Class_info structure. If the class referred to by the underlying CONSTANT_class_info structure is the original class of the rule under consideration, then code modifier 10 adds a CONSTANT_Methodref_ info structure to the constant pool whose class_index points to the CONSTANT_Class_info entry in the constant pool added in step 306 and whose name_and_type index is the same as the name_and_type index of the original CONSTANT_Methodref_info structure. In step 356, the constant pool index for invokespecial is changed to point to the CONSTANT_Method_info structure added in step 354 and code modifier 10 proceeds to step 336. Similarly, if in step 352, code modifier 10 determines that the underlying class pointed to by the index for the "invokespecial" is not the original class defined in the rule, then code modifier 10 will proceed directly to step 336.

Figure 7:
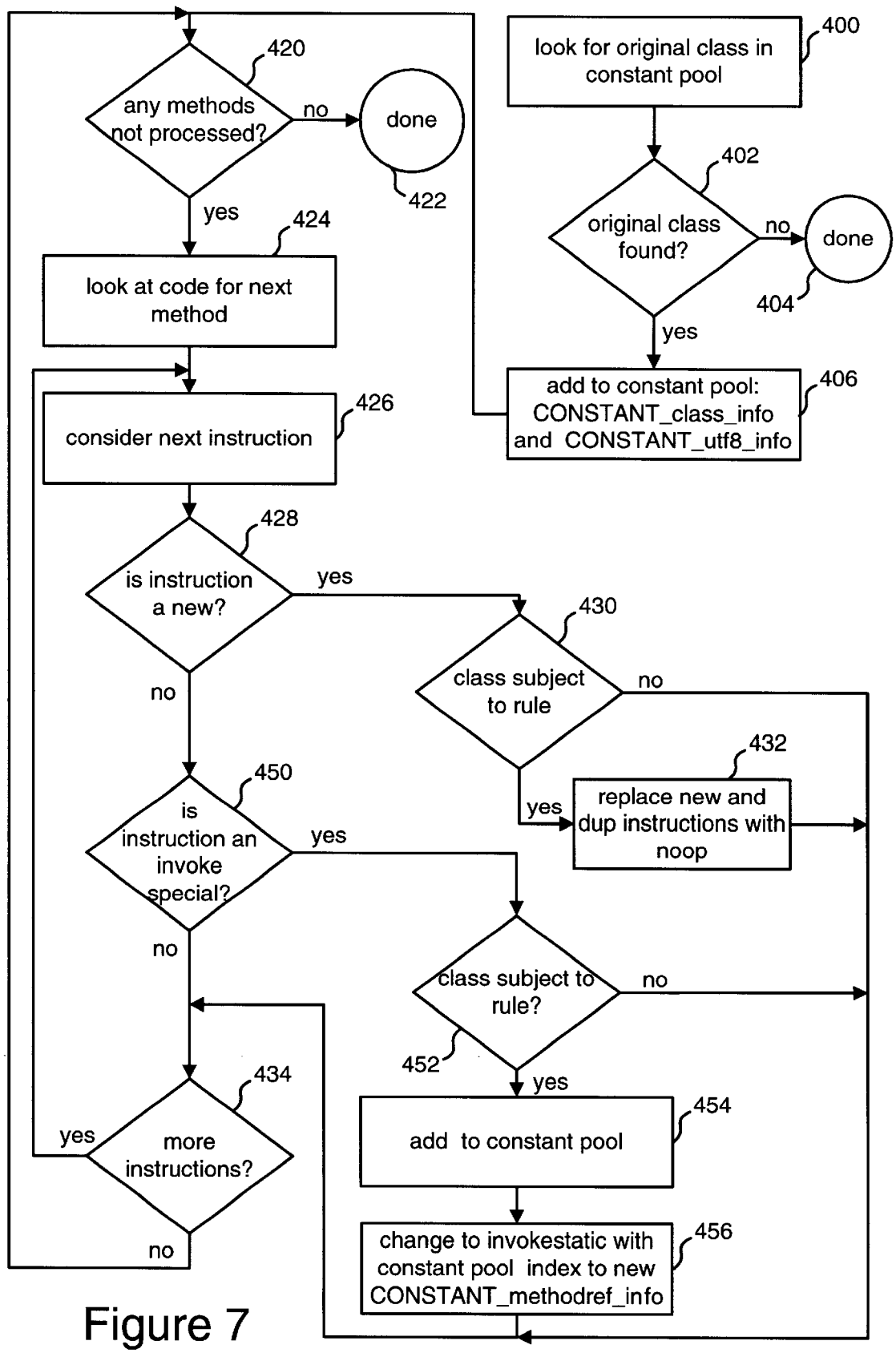
FIG. 7 is a flow chart explaining the proxy class step 92 of FIG. 4.

FIG. 7 is a flow chart which explains proxy class step 92 of FIG. 4. Thus, FIG. 7 explains the operation of carrying out the modifications according to the current proxy class rule under consideration on the class currently loaded into the class data structure. The method starts at step 400, at which time code modifier 10 looks through the constant pool for a reference to the original class stated in the proxy class rule. This step is similar to step 300 of FIG. 6. If the original class is not found (test in step 402), then the method of FIG. 7 is completed (step 404). If a reference to the original class is found, then (in step 406) code modifier 10 adds to the constant pool a new CONSTANT_Utf8_info structure which stores the name of the new class and a new CONSTANT_Class_info structure which points to the newly added CONSTANT_Utf8_info structure. After adding the new entries to the constant pool, code modifier 10 determines whether any methods in the current class have not yet been processed (step 420). If all the methods have been processed, then the method of FIG. 7 is completed (step 422). If there are more methods to process, then code modifier 10 looks at the code for the next method to be processed in step 424. In step 426, code modifier 10 considers the next instruction of the current method being processed. If that instruction is a "new" (step 428), then code modifier 10 determines whether the class pointed to by the index for the "new" is the original class in the proxy rule (step 430). If so, the new instruction (including its index) is replaced with a "nop" (step 432). A "nop" is an instruction that performs no operation. Sometimes a "new" instruction is followed with a "dup" instruction. If so, the dup instruction is also replaced with a "nop." A "dup" is an instruction that duplicates the top operand stack word. After replacing the "new" and "dup" instructions, code modifier 10 determines whether any more instructions need to be considered for the current method (step 434). If so, code modifier 10 loops back to step 426 and considers the next instruction. If there are no more instructions in the current method, then code modifier 10 loops back to step 420 and determines whether any additional methods need be processed. If in step 430 code modifier 10 determines that the class pointed to by the index for the "new" is not the original class stated in the proxy rule, then code modifier 10 proceeds to step 434.

If, in step 428, code modifier 10 determines that the instruction being considered is not a "new" then code modifier 10 proceeds to step 450 and determines whether the instruction is an "invokespecial." If the instruction is not an "invokespecial," then code modifier 10 proceeds to step 434 to determine whether there are any more instructions in the current method. If the instruction is an "invokespecial," then code modifier 10 determines whether the class pointed to by the index is the original class of the proxy class rule (step 452). If it is not the original class, code modifier 10 loops to step 434. If it is the original class, code modifier 10 adds to the constant pool a new CONSTANT_NameAndType_info structure and two CONSTANT_Utf8_info structures which store the strings for the name and type. Step 454 also includes adding a CONSTANT_Methodref_info structure to the constant pool, whose class_index points to the CONSTANT_Class_info structure added in step 406 and whose name_and_type index points to the CONSTANT_NameAndType_info structure added in step 454. In step 456, code modifier 10 changes the "invokespecial" to a "invokestatic." The "invokestatic" is given a constant pool index pointing to the CONSTANT_Methodref_info structure added in step 454.

Figure 8:
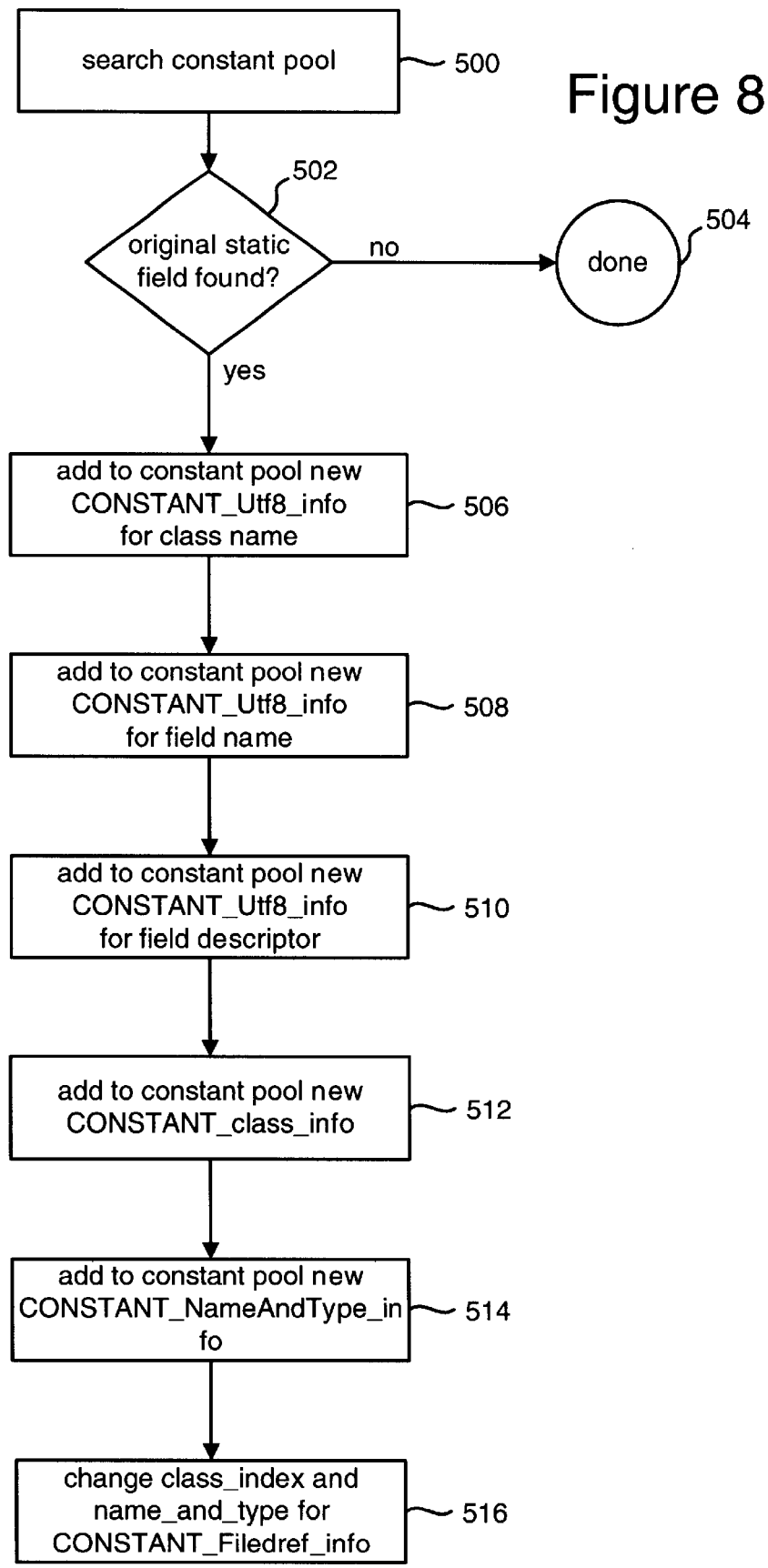
FIG. 8 is a flow chart explaining the substitute static field step 98 of FIG. 4.

FIG. 8 is a flow chart which explains the method of the substitute static field step 98 of FIG. 4. That is, FIG. 8 explains the steps necessary to perform the code modifications according to the substitute static field rule currently under consideration on the class currently loaded into the class data structure. The method starts at step 500 with the code modifier 10 searching the constant pool for original static field cited in the current rule. That is, code modifier 10 will search the constant pool for CONSTANT_Fieldref_info structures, and look at the CONSTANT_Utf8_info structure eventually pointed to which stores the name of the field to determine if it matches the name of the original static field. If the original static field is not found (step 502), then the method of FIG. 8 is done (step 504). If the original static field is found (step 502), then code modifier 10 proceeds to step 506 and adds to the constant pool a CONSTANT_Utf8_info structure storing the name of the class defining the new static field. In step 506, code modifier 10 adds to the constant pool a CONSTANT_Utf8_info structure storing the name of the new static field. In step 510, code modifier 10 adds a CONSTANT_Utf8_info structure storing the field descriptor for the new static field. In step 512, code modifier 10 adds a new CONSTANT_Class_info structure into the constant pool, having a name index pointing to the CONSTANT_Utf8_info structure added in step 506. In step 514, code modifier 10 adds to the constant pool a new CONSTANT_NameAndType_info structure, which will have a name_index pointing to the CONSTANT_Utf8_info structure added in step 508 and a descriptor index pointing to the CONSTANT_Utf8_info structure added in step 510. In step 516, the class_index and name_and type_index for the CONSTANT_Fieldref_info structure of the original field under consideration are changed to point to the CONSTANT_Class_info structure and the CONSTANT_NameAndType_info structures added in steps 512 and 514.

To better explain the principals discussed above, consider the following example. Suppose a user of code modifier 10 has an original Java program that is an applet that presents a push button. The following Java source code will represent that example Java applet (SampleApplet.java):

```
SampleApplet.java
//import user interface and classes supplied
//by the java standard api
import java.awt.Button;
import java.awt.Color;
import java.applet.Applet;
//this simple applet presents a push button.
public class SampleApplet extends Applet
{
    //when the applet is created, add a push
    //button to the applet's visible area
    public SampleApplet( )
    {
        //create a string object that stores the tile
        String title=new String ("Simple Applet");
        //create a button and place it in the applet
        add (new Button (title));
        //set the applet's background color to yellow
        setBackground (Color.yellow);
    }
}
```

If the above applet was compiled, an object code file would be created which included instructions from the instructions set for the Java Virtual Machine. The file below, Before.txt, is a human readable disassembly of the Java object code corresponding to the SampleApplet above. Note that for the instructions which construct an index into the constant pool from two index bytes, the file below only shows the constructed index. For example, at line 4, the "new" instruction has a "#8" next to the code for "new." This #8 is the constructed index into the constant pool. Next to the index is "<Class Java.lang.String>." That identified class is the class pointed to by the index (identified by the CONSTANT_Class_info structure).

```
Before.txt
Compiled from SampleApplet.java
public synchronized class SampleApplet extends java.applet.Applet
/* ACC_SUPER bit set */
{
    public SampleApplet( );
}
Method SampleApplet( )
    0 aload_0
    1 invokespecial #9 <Method java. applet.Applet( )>
    4 new #8 <Class java.lang.String>
    7 dup
    8 ldc #1 <String "Simple Applet">
    10 invokespecial #11 <Method java.lang.String (java.lang.Sting)>
    13 astore_1
    14 aload_0
    15 new #4 <Class java.awt.Button>
    18 dup
    19 aload_1
    20 invokespecial #10 <Method java awt.Button (java.lang.String)>
    23 invokevirtual #12 <Method java.awt.Component add (java.awt.Component)>
    26 pop
    27 aload_0
    28 getstatic #14 <Field java.awt.Color yellow>
    31 invokevirtual #13 <Method void setBackground (java.awt.Color)>
    34 return
```

Suppose, for this example, that the user of code modifier 10 intends to make three changes. First, the user wants to replace the class Button with a new class RedButton, so that wherever a Java program calls for a button, a RedButton will appear. The second change is that anywhere in the applet there is a use of the color yellow, the user wants green to be used instead. The third change may be that the user wants all text displayed on the GUI to be uppercase. To effectuate these changes, the user needs to do at least two things. First, the user needs to set up a rules file and second, the user needs to create the additional classes. An example of a rules file (Sample.di) is shown below. The rules file contains three rules. The first rule is a substitute class rule which substitutes the RedButton class for the Button class. The second rule is a substitute static field rule that substitute green for yellow. The third rule is a proxy class rule to proxy java/lang/String using UpperCaseProxyString.

```
Sample.di

# Rules file

# This file specifies how the code modifier
# will modify the class inheritance structure
# of its target class files.

# Replacement classes (e.g., RedButton) are supplied in
# the following file
MergeFile: mergeclassesjar
# replace all allocations. and subclassing of java/awt/Button
    with RedButton
SubstituteClass: java/awt/Button RedButton
# change all references to the color "yellow" to be the color
    "green"
SubstituteStaticField: java.awt.Color.yellow java.awt.Color.green
# use a proxy constructor for all allocations of java/lang/
    String
ProxyClass: java/lang/String UpperCaseProxyString
```

Below is the definition of the RedButton class. This source is stored in a file called RedButtonjava. The object code for RedButtonjava is part of a package of class files found in mergeclass.jar, which represents the additional classes submitted to code modifier 10.

```
RedButton.java
import java.awt.Button;
import java.awt.Color;
//this is an extension of a simple button. The Diagnos
//System will automatically replace allocations of objects
//of type, "Button" with "RedButton". In effect, this will
//make all buttons in the modified program be red.
public class RedButton extends Button
{
    //when the button is constructed, set the color to red
    public RedButton ( )
    {
        //call the inherited constructor
        super ( );
        //set the color to red
        setbackground (Color.red);
    }
    //This is also a constructor for the button.
    //also set the color to red when this constructor is called.
    public RedButton (String title)
    {
        //call the inherited constructor
        super (title);
        //set the color to red
        setbackground (Color.red);
    }
}
```

Below is the definition for UpperCaseProxyString. The source will be stored in a file called UpperCaseProxyString.java The object code for UpperCaseProxyString.java is part of a package of class files found in mergeclass.jar, which represents the additional classes submitted to code modifier 10.

```
UpperCaseProxyString.java
import java.io.UnsupportedEncodingException;
//this is a proxy allocator for strings to demonstrate the
//final class allocation substitution funtionality of
//the code modifier. This sample version simply converts
//the string to upper case
public class UpperCaseProxyString
{
    //there must be one "proxy allocator" for each public
    //constructor of the class we are proxying (i.e., String)
    //the proxy allocator must return the newly allcoated
    //string, and must have the same prototype (parameter list)
    //as its corresponding constructor in the String class
    public static String createProxyObject ( )
    {
        return new String ( );
    }
    public static String createProxyObject (byte[ ] b)
    {
        return new String (b).toUpperCase ( );
    }
    public static String createProxyObject (byte[ ] b, int i)
    {
        return new String (b, i).toUpperCase ( );
    }
    public static String createProxyObject (byte[ ] b, int i, int j)
    {
        return new String (b, i, j).toUpperCase ( );
    }
    public static String createProxyObject (byte[ ] b, int i, int j, int k)
    {
        return new String (b, i, j, k).toUpperCase ( );
    }
    public static String createProxyObject (byte[ ] b, int i, int j, String s) throws UnsupportedEncodingException
    {
        return new String (b, i, j, s).toUpperCase ( );
    }
    public static String createProxyObject (char[ ] c)
    {
        return new String (c).toUpperCase ( );
    }
    public static String createProxyObject (char[ ] c, int i, int j)
    {
        return new String (c, i, j).toUpperCase ( );
    }
    public static String createProxyObject (String s) .
    {
        return new String (s).toUpperCase ( );
    }
    public static String createProxyObject (StringcBuffer s)
    {
        return new String (s).toUpperCase ( );
    }
}
```

The code from UpperCaseProxyString.java and RedButton.java, Sample.di (the rules) and the code represented by Before.txt would be inputs to code modifier 10. Code modifier 10 would operate on these inputs as described above and produce an output. Below is a disassembly of a sample output (After.txt) showing the results of enhancing Before.txt.

After.txt
public synchronized class SampleApplet extends java.applet.Applet
/* ACC_SUPER bit set */
{
    public SampleApplet( );
}
Method SampleApplet( )
    0 aload_0
    1 invokespecial #9 <Method javaapplet.Applet( )>
    4 nop
    5 nop
    6 nop
    7 nop
    8 ldc #1 <String "Simple Applet">
    10 invokestatic #52 <Method java.lang.String createProxyObject(java.lang. String)>
    13 astore_1
    14 aload_0
    15 new #45 <Class RedButton>
    18 dup
    19 aload_1
    20 invokespecial #46 <Method RedButton (java.lang.String)>
    23 invokevirtual #12 <Method java.awt.Component add (java.awt.Component)>
    26 pop
    27 aload_0
    28 getstatic #14 <Field java.awt.Color green>
    31 invokevirtual #13 <Method void setBackground (java.awt.Color)>
    34 return As can be seen from the above code, all three rules in Sample.di were implemented on the sample java applet. For example, the proxy class rule requested the use of UpperCaseProxyString as a proxy for allocations of java/lang/String. As explained in the method of FIG. 7, the new and dup of lines 4 and 7 from Before.txt have been changed to nops on lines 4–7 of After.txt, and invokespecial (line 10 of Before.txt) was changed to invokestatic with the appropriate constant pool index. The substitute class rule was performed by changing the indexes of both the "new" on line 15 and the invokespecial on line 20. Finally, on line 28, the static field reference was changed from yellow to green.

Figure 9:
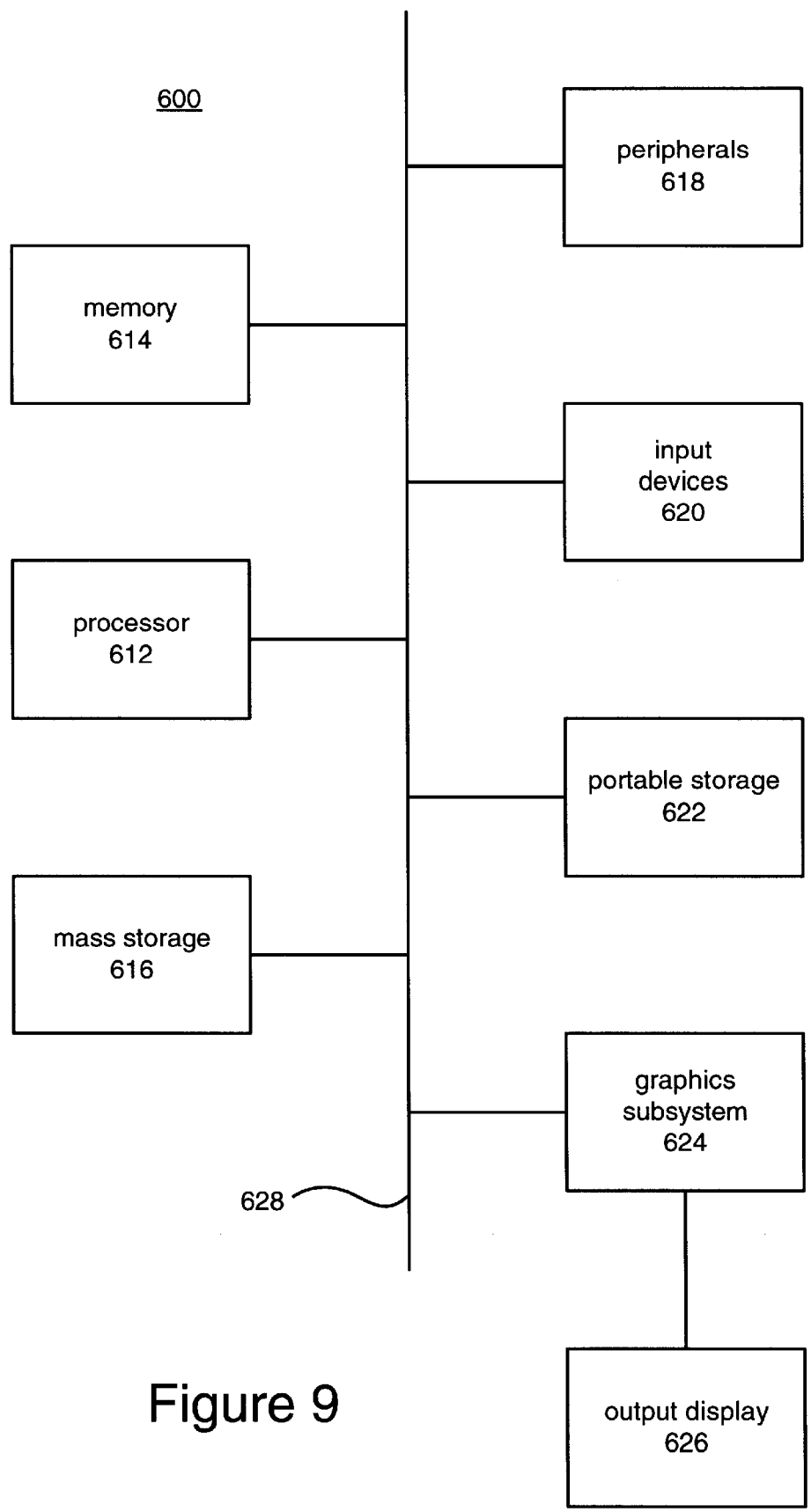
FIG. 9 is a block diagram of one exemplar hardware platform for implementing the present invention.

FIG. 9 illustrates a high level block diagram of a general purpose computer system which can be used to run the software that implements code modifier 10. Computer system 600 contains a processor unit 612 and main memory 614. Processor unit 612 may contain a single microprocessor, or may contain a plurality of microprocessors for configuring computer system 600 as a multi-processor system. Main memory 614 stores, in part, instructions and data for execution by processor unit 612. If the system for modifying code of the present invention is wholly or partially implemented in software, main memory 614 stores the executable code when in operation. Main memory 614 may include banks of dynamic random access memory (DRAM), as well as high speed cache memory.

Computer system 600 further includes a mass storage device 616, peripheral device(s) 618, input device(s) 620, portable storage medium drive(s) 622, a graphics subsystem 624 and an output display 626. For purposes of simplicity, the components in computer system 600 are shown in FIG. 9 as being connected via a single bus 628. However, computer system 600 may be connected through one or more data transport means. For example, processor unit 612 and main memory 614 may be connected via a local microprocessor bus, and the mass storage device 616, peripheral device(s) 618, portable storage medium drive(s) 622, graphics subsystem 624 may be connected via one or more input/output (I/O) buses. Mass storage device 616, which may be implemented with a magnetic disk drive or an optical disk drive, is a non-volatile storage device for storing data and instructions for use by processor unit 612. In one embodiment, mass storage device 16 stores the system software implementing code modifier 10 for purposes of loading to main memory 614.

Portable storage medium drive 622 operates in conjunction with a portable non-volatile storage medium, such as a floppy disk, to input and output data and code to and from computer system 600. In one embodiment, the system software for modifying object code is stored on such a portable medium, and is input to the computer system 600 via the portable storage medium drive 622. Peripheral device(s) 618 may include any type of computer support device, such as an input/output (I/O) interface, to add additional functionality to the computer system 600. For example, peripheral device(s) 618 may include a network interface card for interfacing computer system 600 to a network, a modem, etc.

Input device(s) 620 provide a portion of the user interface for a user of computer system 600. Input device(s) 620 may include an alpha-numeric keypad for inputting alphanumeric and other key information, or a cursor control device, such as a mouse, a trackball, stylus, or cursor direction keys. In order to display textual and graphical information, computer system 600 contains graphics subsystem 624 and the output display 626. Output display 626 may include a cathode ray tube (CRT) display, liquid crystal display MCD) or other suitable display device. Graphics subsystem 624 receives textual and graphical information, and processes the information for output to output display 626. Output display 626 can be used to report the results of a code modification. The components contained in computer system 600 are those typically found in general purpose computer systems, and are intended to represent a broad category of such computer components that are well known in the art. The system of FIG. 9 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, routers, and so on.

The Detailed Description above explains the details of practicing the current invention on Java code. It is contemplated that the current invention can be used with other object oriented programming languages or binary architectures. With each different language or architecture many of the details of implementing the current invention may change; however, the overall inventive concept claimed may remain the same.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be

I claim:

1. A method implemented on one or more machines for modifying object oriented code, comprising the steps of:
   reading a rule defining a change to object code, said rule is in a machine readable format, said object code including a definition of an object oriented class;
   searching said object code for an allocation of a first object based on a first class, said object code is in a machine readable format;
   finding said allocation of said first object based on said first class;
   modifying said object code based on said rule, said step of modifying includes changing said allocation of said first object based on said first class to an allocation of said first object based on a second class; and
   storing said modified object code in a machine readable format, said steps of reading, searching, finding, modifying and storing are performed by said one or more machines.

2. A method according to claim 1, wherein:
   said second class extends said first class.

3. A method according to claim 2, further including the step of:
   merging said second class with said first class.

4. A method according to claim 2, wherein said step of modifying includes the steps of:
   changing a first reference of a creation instruction to refer to said second class; and
   changing a first instruction which invokes a constructor for said first class to a second instruction which invokes a constructor for said second class.

5. A method according to claim 4, further including the step of:
   reading said object code into a data structure, said data structure includes a table of constant information, said step of changing said first reference changes an index into said table of constant information.

6. A method according to claim 6, wherein said step of modifying further includes the step of:
   adding to said data structure a reference to said second class;
   said step of changing said first reference changes an index which points to said reference to said first class to an index which points to said reference to said second class;
   said step of changing said first instruction includes the step of adding a reference to said constructor for said second class, said second instruction including an index pointing to said reference to said constructor for said second class.

7. A method according to claim 1, wherein:
   said object oriented class has a superclass;
   said object code including an identification of said superclass; and
   said step of modifying includes changing said identification of said superclass from an original class to a new class, said new class extends said original class.

8. A method according to claim 1, wherein said step of modifying further includes:
   changing third code that allocates a third object of a third class to fourth code that invokes a static method that allocates said third object of said third class.

9. A method according to claim 8, wherein:
   said third class is a final class.

10. A method according to claim 8, wherein said step of modifying includes the steps of
    looking for a creation instruction which includes a first reference to said third class; and
    changing said creation instruction to a nop.

11. A method according to claim 8, further including the step of:
    reading said object code into a data structure, said data structure includes a table of constant information;
    said step of modifying further includes the steps of:
       searching said data structure for a reference to said third class,
       adding to said data structure a reference to a fourth class,
       searching said data structure for a first instruction that invokes a constructor of said third class,
       adding to said table a reference to said static method, and
       changing said first instruction to a second instruction, said second instruction invokes said static method.

12. A method according to claim 1, wherein said step of modifying further includes:
    changing a reference to a first static field to a reference to a second static field.

13. A method according to claim 12, further including the step of:
    reading said object code into a data structure, said data structure includes a table of constant information.

14. A method according to claim 13, wherein said step of changing a reference to a first static field includes the steps of:
    searching said table for a first reference to said first static field;
    adding to said table a second reference to said second static field; and
    changing a third reference to a fourth reference, said third reference points to said first reference and said fourth reference points to said second reference.

15. A method according to claim 1, further including the step of:
    reading said object code into a data structure, said step of modifying includes modifying said data structure.

16. A method according to claim 1, wherein:
    said object code is Java object code.

17. A method according to claim 1, wherein:
    said object code includes definitions of a plurality of object oriented classes; and
    said steps of modifying and storing are performed for each of said object oriented classes.

18. A method according to claim 1, wherein:
    said object oriented class has a superclass;
    said Java object code including an identification of said superclass;
    said step of modifying includes changing said identification of said superclass from an original class to a new class, said new class extends said original class;
    said step of modifying further includes changing third code that allocates a third object of a third class to fourth code that invokes a static method that allocates said third object of said third class, said third class is a final class; and
    said step of modifying further includes changing a reference to a first static field to a reference to a second static field.

19. A method according to claim 1, wherein:
said step of modifying includes changing a bytecode.
20. A method according to claim 1, wherein:
said step of modifying includes changing a reference to a constant pool, said reference is part of a set of bytecodes.
21. A method according to claim 1, wherein:
said step of searching includes searching for a new instruction; and
said step of modifying includes changing an index for said new instruction.
22. A method according to claim 21, wherein:
said step of searching includes searching for an invokespecial instruction; and
said step of modifying includes changing an index for said invokespecial instruction.
23. A method according to claim 1, wherein:
said second class extends said first class;
said step of searching includes searching for a new instruction in bytecode, said new instruction has an index into a constant pool, said index references said first class; and
said step of modifying includes changing said index to reference said second class.
24. A method according to claim 1, wherein:
said one or more machines include one or more computers programmed to perform the steps of reading, searching, finding, modifying and storing.
25. One or more processor readable storage devices having processor readable code embodied on said processor readable storage devices, said processor readable code for programming one or more processors to perform a method comprising the steps of:
reading a rule defining a change to object code, said object code defining an object oriented class;
searching said object code for an allocation of a first object based on a first class;
finding said allocation of said first object based on said first class;
modifying said object code based on said rule, said step of modifying includes changing said allocation of said first object based on said first class to an allocation of at least one object based on a second class.
26. One or more processor readable storage devices according to claim 25, wherein said step of modifying further includes the steps of:
changing a first reference for a creation instruction to refer to said second class; and
changing a first instruction which invokes a constructor for said first class to a second instruction which invokes a constructor for said second class.
27. One or more processor readable storage devices according to claim 25, wherein:
said object oriented class has a superclass;
said object code including an identification of said superclass; and
said step of modifying includes changing said identification of said superclass from an original class to a new class, said new class extends said original class.
28. One or more processor readable storage devices according to claim 25, wherein said step of modifying includes:
changing third code that allocates a third object of a third class to fourth code that calls a method that allocates at least one object of said third class, said third class is a final class.
29. One or more processor readable storage devices according to claim 25, wherein said step of modifying includes:
changing a reference to a first static field to a reference to a second static field.
30. One or more processor readable storage devices according to claim 25 wherein:
said object code is Java object code; and
said second class extends said first class.
31. One or more processor readable storage devices according to claim 25, wherein:
said second class extends said first class;
said step of searching includes searching for a new instruction in bytecode, said new instruction has an index into a constant pool, said index references said first class; and
said step of modifying includes changing said index to reference said second class.
32. One or more processor readable storage devices according to claim 25, wherein:
said step of searching includes searching for a new instruction; and
said step of modifying includes changing an index for said new instruction.
33. One or more processor readable storage devices according to claim 25, wherein:
said step of searching includes searching for an invokespecial instruction; and
said step of modifying includes changing an index for said invokespecial instruction.
34. One or more processor readable storage devices according to claim 33, wherein:
said step of searching includes searching for a new instruction; and
said step of modifying includes changing an index for said new instruction.
35. An apparatus capable of modifying Java code, comprising:
one or more input devices;
one or more output devices;
one or more processors in communication with said one or more input devices and said one or more output devices; and
one or more storage devices in communication with said one or more processors, said one or more storage devices store program code, said program code programs said one or more processors to perform the steps of:
reading a rule defining a change to Java object code, said Java object code defining an object oriented class;
searching said object code for an allocation of a first object based on a first class;
finding said allocation of said first object based on said first class;
modifying said Java object code based on said rule, said step of modifying includes changing said allocation of said first object based on said first class to an allocation of said first object based on a second class, said second class extends said first class.
36. An apparatus according to claim 35, wherein:
said object oriented class has a superclass;
said Java object code including an identification of said superclass; and said step of modifying includes changing said identification of said superclass from an original class to a new class, said new class extends said original class.

37. An apparatus according to claim 35, wherein said step of modifying includes:
changing third code that allocates a third object of a third class to fourth code that calls a static method that allocates said third object of said third class, said third class is a final class.

38. An apparatus according to claim 35, wherein said step of modifying includes:
changing a reference to a first static field to a reference to a second static field.

39. An apparatus according to claim 35, wherein:
said second class extends said first class;
said step of searching includes searching for a new instruction in bytecode, said new instruction has an index into a constant pool, said index references said first class; and
said step of modifying includes changing said index to reference said second class.

40. An apparatus according to claim 35, wherein:
said step of searching includes searching for an invokespecial instruction; and
said step of modifying includes changing an index for said invokespecial instruction.

41. A method implemented on one or more machines for modifying object oriented code, comprising the steps of:
reading a rule defining a change to object code, said object code including a definition of an object oriented class, said rule is in a machine readable format;
modifying said object code based on said rule, said step of modifying includes changing first code that allocates a first object of a first class to second code that invokes a method that allocates said first object of said first class; and
storing said modified object code in machine readable format, said steps of reading modifying and storing are performed by said one or more machines.

42. A method according to claim 41, wherein said step of modifying includes the steps of:
looking for a creation instruction which includes a first reference to said first class; and
changing said creation instruction to a nop.

43. A method according to claim 41, wherein:
said first class is a final class.

44. A method according to claim 43, wherein:
said method is a static method.

45. A method according to claim 44, wherein:
said method further includes the steps of reading said object code into a data structure, said data structure includes a table of constant information;
said step of modifying further includes the steps of:
searching said data structure for a reference to said first class,
adding to said data structure a reference to said second class if said step of searching finds said reference to said first class,
searching said data structure for a first instruction that invokes a constructor of said first class,
adding to said table a reference to said static method, and
changing said first instruction to a second instruction, said second instruction invokes said static method.

46. A method according to claim 41, wherein:
said step of modifying includes removing a new instruction and an invokespecial instruction, and adding an invokestatic instruction.

47. A method according to claim 41, wherein:
said step of modifying includes replacing an invokespecial instruction with an invokestatic instruction.

48. A method according to claim 41, wherein:
said step of modifying includes changing bytecode.

49. A method according to claim 41, wherein:
said step of modifying includes changing a first instruction with a first index to a second instruction with a second index;
said second index refers to said method;
said method is a static method; and
said first class is a final class.

50. A method according to claim 41, further including the steps of:
searching said object code for said first code that allocates said first object at said first class; and
finding said first code.

51. A method according to claim 41, wherein:
said one or more machines include one or more computers programmed to perform said steps of reading, modifying and storing.

52. One or more processor readable storage devices having processor readable code embodied on said processor readable storage devices, said processor readable code for programming one or more processors to perform a method comprising the steps of:
reading a rule defining a change to object code, said object code including a definition of an object oriented class; and
modifying said object code based on said rule, said step of modifying includes changing first code that allocates a first object of a first class to second code that calls a static method that allocates said first object of said first class.

53. One or more processor readable storage devices according to claim 52, wherein said step of modifying includes the steps of:
looking for a creation instruction which includes a first reference to said first class; and
changing said creation instruction to a nop.

54. One or more processor readable storage devices according to claim 52, wherein:
said first class is a final class; and
said object code is Java object code.

55. One or more processor readable storage devices according to claim 54, wherein:
said method further includes the step of reading said object code into a data structure, said data structure includes a table of constant information;
said step of modifying further includes the steps of:
searching said data structure for a reference to said first class,
adding to said data structure a reference to said second class if said step of searching finds said reference to said first class,
searching said data structure for a first instruction that invokes a constructor of said first class,
adding to said table a reference to said static method, and
changing said first instruction to a second instruction, said second instruction invokes said static method.

56. One or more processor readable storage devices according to claim 52, wherein:

said step of modifying includes replacing an invoke special instruction with an invokestatic instruction.

57. One or more processor readable storage devices according to claim 52, wherein:

said step of modifying includes changing a first instruction with a first index to a second instruction with a second index;

said second index refers to said method;

said method is a static method; and said first class is a final class.

58. One or more processor readable storage devices according to claim 52, wherein said method further comprises the steps of:

searching said object code for said first code that allocates said first object of said first class; and finding said first code.

59. An apparatus capable of modifying object oriented code, comprising:

one or more input devices;

one or more output devices;

one or more processors in communication with said one or more input devices and said one or more output devices; and one or more storage devices in communication with said one or more processors, said one or more storage devices adapted to store program code, said program code programs said one or more processor to perform the steps of:

reading a rule defining a change to Java object code, said Java object code defining an object oriented class, and modifying said Java object code based on said rule, said step of modifying includes changing first code that allocates a first object of a first class to second code that invokes a static method that allocates said first object of said first class.

60. An apparatus according to claim 59, wherein:

said first class is a final class.

61. An apparatus according to claim 59, wherein:

said step of modifying includes replacing an invoke special instruction with an invoke static instruction.

62. An apparatus according to claim 59, wherein:

said step of modifying includes changing a first instruction with a first index to a second instruction with a second index;

said second index refers to said static method; and said first class is a final class.

63. An apparatus according to claim 59, wherein:

said method further includes the steps of reading said object code into a data structure, said data structure includes a table of constant information;

said step of modifying includes the steps of:

searching said data structure for a reference to said first class, adding to said data structure a reference to said second class if said step of searching finds said reference to said first class, searching said data structure for a first instruction that invokes a constructor of said first class, adding to said table a reference to said static method, and changing said first instruction to a second instruction, said second instruction invokes said static method.

64. An apparatus according to claim 59, wherein said method further comprises the steps of:

searching said object code for said first code that allocates said first object of said first class; and finding said first code.

65. An apparatus capable of modifying object oriented code, comprising:

one or more input devices;

one or more output devices;

a processor in communication with said one or more input devices and said one or more output devices; and a storage device in communication with said processor, said storage device adapted to store program code, said program code programs said processor to perform the steps of:

reading a rule defining a change to Java object code, said Java object code defining an object oriented class, and modifying said Java object code based on said rule, said step of modifying includes changing a reference to a first static field to a reference to a second static field.

* * * * *

UNITED STATES PATENT AND TRADEMARK OFFICE
CERTIFICATE OF CORRECTION

PATENT NO.    : 6,260,187 B1
DATED         : July 10, 2001
INVENTOR(S)   : Cirne Page 1 of 1

It is certified that error appears in the above-identified patent and that said Letters Patent is hereby corrected as shown below:

<u>Column 23,</u>
Line 40, after "reading" and before "modifying" insert -- , --

Signed and Sealed this

Seventeenth Day of August, 2004

JON W. DUDAS
*Acting Director of the United States Patent and Trademark Office*